(12) United States Patent
Le Comte et al.

(10) Patent No.: US 8,704,712 B2
(45) Date of Patent: Apr. 22, 2014

(54) SYSTEM AND METHOD OF GENERATING A RADIO FREQUENCY SIGNAL

(75) Inventors: David Le Comte, Rydalmere (AU);
Andrew Cain, Rydalmere (AU)

(73) Assignee: Indra Australia Pty Limited (AU)

(*) Notice: Subject to any disclaimer, the term of this patent is extended or adjusted under 35 U.S.C. 154(b) by 310 days.

(21) Appl. No.: 13/063,599

(22) PCT Filed: Sep. 11, 2009

(86) PCT No.: PCT/AU2009/001208
§ 371 (c)(1),
(2), (4) Date: May 10, 2011

(87) PCT Pub. No.: WO2010/028453
PCT Pub. Date: Mar. 18, 2010

(65) Prior Publication Data
US 2011/0215968 A1 Sep. 8, 2011

Related U.S. Application Data

(60) Provisional application No. 61/096,211, filed on Sep. 11, 2008.

(51) Int. Cl.
*G01S 1/40* (2006.01)

(52) U.S. Cl.
USPC .......................................................... 342/406

(58) Field of Classification Search
USPC ................................................. 342/406, 402
See application file for complete search history.

(56) References Cited

U.S. PATENT DOCUMENTS

| | | | | |
|---|---|---|---|---|
| 3,896,444 A | * | 7/1975 | Lin | 342/406 |
| 3,972,044 A | * | 7/1976 | Alford | 342/406 |
| 4,017,860 A | | 4/1977 | Earp | 342/405 |
| 4,591,861 A | | 5/1986 | Kautz | 342/404 |
| 5,045,859 A | | 9/1991 | Yetter | 342/414 |
| 5,515,378 A | * | 5/1996 | Roy et al. | 370/334 |
| 5,635,941 A | * | 6/1997 | Bertocchi | 342/405 |
| 8,351,483 B1 | * | 1/2013 | Tucker | 342/202 |

FOREIGN PATENT DOCUMENTS

| | | |
|---|---|---|
| EP | 0926916 | 6/1999 |
| WO | WO 97/08839 | 3/1997 |

OTHER PUBLICATIONS

International Search Report issued in International Application No. PCT/AU2009/001208 dated Nov. 25, 2009.
International Preliminary Report on Patentability issued in International Application No. PCT/AU2009/001208 dated Mar. 15, 2010.

\* cited by examiner

*Primary Examiner* — Jack W Keith
*Assistant Examiner* — Fred H Mull
(74) *Attorney, Agent, or Firm* — Fulbright & Jaworski LLP

(57) ABSTRACT

A system and method of generating a radio frequency signal adapted for allowing a receiving device to calculate a navigational indicator relative to a plurality of antennas. The system comprising a radio frequency generator unit for generating: a primary signal for driving at least one antenna of the plurality of antennas to provide a primary transmission; and an actively derived secondary signal to complement the primary signal for driving at least one other antenna of the plurality of antennas to provide, collectively with the primary transmission, the combined transmission, wherein the combined transmission, relative to the primary transmission only, provides a reduced observed distortion at the receiving device.

18 Claims, 8 Drawing Sheets

SYSTEM AND METHOD OF GENERATING A RADIO FREQUENCY SIGNAL

This application is a national phase application under 35 USC §371 from PCT International Application No. PCT/AU2009/001208, filed Sep. 11, 2009, that claims the benefit of U.S. Provisional Application No. 61/096,211, filed Sep. 22, 2008, both of which applications are incorporated by reference herein in their entirety.

FIELD OF THE INVENTION

The present invention relates a system and method for providing a transmission for allowing a receiving device to calculate a navigational indicator relative to a plurality of antennas.

The invention has been developed primarily for use as a radio frequency system for generating Doppler very high frequency omni-directional range (D-VOR) compatible signals and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Known devices for generating signals adapted to enable calculation of a navigational indicator include conventional VHF Omni-directional Range (VOR) systems. These VOR systems originally used the phase relationship between a reference-phase and a rotating-phase signal for encoding a navigational indicator that identifies the angular direction relative to a reference direction. The carrier signal is an omni-directional signal that contains an amplitude modulated (AM) station Morse code or voice identifier. A reference 30 Hz signal is frequency modulated (FM) on a 9960 Hz sub-carrier. A second amplitude modulated (AM) 30 Hz signal is then generated by rotating a directional antenna array 30 times per second. It will be appreciated that upon receipt of the radio signal at an aircraft, a radial line from the station can be determined and followed by a pilot.

Current installations scan electronically to achieve an equivalent result. Typically called a Doppler VOR (D-VOR) system, the carrier is amplitude modulated by the reference signal and frequency modulated by the variable signal. It will be appreciated that the Doppler principle states that there is a change in frequency of a signal received when the distance between the source and receiver changes. When the distance decreases, the frequency increases. The opposite is true when the distance increases.

The D-VOR systems employ two fundamental principles: the Doppler effect for generating frequency modulated (FM) and bearing information, and a wide aperture antenna array for minimizing the effects of multipath propagation. To maintain compatibility with conventional VOR receivers, D-VOR ground station systems radiate signals with the same frequency spectrum as the conventional VOR ground stations, but the azimuth-dependent information is contained in the phase of the frequency modulated signal. For a D-VOR system, the carrier with a 30 Hz amplitude modulation is radiated from an omni-directional reference antenna and is the reference signal. The direction dependent signal is generated in space by rotating the radiated 9960 Hz sidebands from antennas located on the circumference of a circle.

The circular motion is electronically simulated by a number of antennas equally spaced around the circumference, which are sequentially driven by radio frequency (RF) signals so that a substantially continuous movement of the radiating source is achieved. The D-VOR receiver observes a Doppler shift of sideband frequencies deviating approximately at ±480 Hz thirty times a second. The D-VOR system may be a single sideband D-VOR, a doubled sideband D-VOR, or an alternating double sideband D-VOR system.

By way of example, in a D-VOR system, the reference 30 Hz signal is obtained by amplitude modulating the VHF carrier with a 30 Hz sine wave signal, and is radiated omni-directionally so that its phase is independent of the aircraft's position. The other signal has a phase that reflects the bearing around the VOR station.

As the 30 Hz signals have to be separated, a sub-carrier can be introduced. This sub-carrier, by way of example, can be in the form of two sidebands (SB1 and SB2) at 9960 Hz above and below the carrier frequency ($F_c$). In this example, the upper sideband (SB1) is at frequency ($F_c$+9960 Hz) and the lower sideband (SB2) is at frequency ($F_c$−9960 Hz).

It will be appreciated that the sidebands are frequency modulated, by transmitting the signals from various locations from an antenna array comprising a plurality of circumferentially located antennas, such that the transmission location rotates at 30 revolutions per second. To an observer in the far field, the frequency of the sidebands changes at a 30 Hz rate, because of the Doppler effect, and are considered to be frequency modulated at 30 Hz. The sub-carrier then space modulates the VHF carrier. The phase of the variable signal is dependant on the relative position of the receiver (aircraft) to the antenna array.

The sidebands are typically radiated from a number of circumferential sideband antennas as the location is rotated, such that SB1 and SB2 are situated diametrically opposite each other. Energy is supplied sequentially to each antenna, to simulate the rotation, and the Doppler effect provides FM modulation to the sideband.

The frequency modulation of the radiated carrier has a frequency deviation ($f_D$) that is dependant on the diameter of the antenna array (D), rotational frequency ($f_{rot}$) and the wavelength of the sideband ($\lambda$). The frequency deviation can be expressed mathematically by the following equation:

$$f_D = \frac{\pi D f_{rot}}{\lambda}$$

The resulting Doppler effect produces a sinusoidal frequency modulation of the carrier frequency; the phase of which provides the bearing information.

At the receiver, the two 30 Hz signals are detected and compared to determine the phase angle between them. This phase angle is equal to the direction from the station to the airplane, typically with reference to local magnetic north.

It will be appreciated that, as a result of generating a FM signal by selectively switching between circumferential antennas, signal artefacts (or sources of distortion) are present in the combined transmission. Attempts to in part reduce these artefacts have been disclosed in the following two documents.

U.S. Pat. No. 3,972,044 discloses replacing conventional omni-directional loop antennas, typically used in circumferential antenna array, with directional antennas. These directional antennas radiate "shaped" patterns to compensate for the effect of the counterpoise.

U.S. Pat. No. 4,591,861 discloses the use of two antenna groups radiating elliptical radiation patterns, such that the radiation pattern resulting from the superposition of the two ellipses approximates a circular radiation pattern. This is regardless of receiver position and of the position of the antenna pair on the circumference. This is achieved by applying a passive network to split a portion of the signal, suitably phase shift the apportioned signals from the odd and even antennas to adjacent pairs of odd and even antennas.

Both these solutions attempt, with respect to a conventional D-VOR system, some form of fixed pre-distortion of each antenna pattern.

OBJECT OF THE INVENTION

It is an object of the present invention to overcome or ameliorate at least one of the disadvantages of the prior art, or to provide a useful alternative.

It is an object of the invention in its preferred form to provide an improved system and method of generating a radio frequency signal for allowing a receiving device to calculate a navigational indicator relative to a plurality of antennas.

SUMMARY OF THE INVENTION

According to a first aspect of the invention there is provided a system for providing a combined transmission for allowing a receiving device to calculate a navigational indicator relative to a plurality of antennas, the system comprising a radio frequency generator unit for generating:
- a primary signal for driving at least one antenna of the plurality of antennas to provide a primary transmission; and
- an actively derived secondary signal to complement the primary signal for driving at least one other antenna of the plurality of antennas to provide, collectively with the primary transmission, the combined transmission,
- wherein the combined transmission, relative to the primary transmission only, provides a reduced observed distortion at the receiving device.

Preferably, the frequency generator unit is adapted to generate at least two primary signals for independently driving a first pair of adjacent antennas of the plurality of antennas to provide the primary transmission. More preferably, the frequency generator unit is adapted to separately apply a predetermined blending function to each of the at least two primary signals for transitioning the principal source of the primary transmission from one antenna to another adjacent antenna in the first pair of antennas. Most preferably, the frequency generator unit is adapted to generate at least two secondary signals, wherein each secondary signal is for driving a respective antenna of the plurality of antennas such that the first pair of adjacent antennas is disposed therebetween.

The plurality of antennas are preferably arranged circumferentially about a circle, wherein the frequency generator unit is adapted to generate;
- a first set of signals including at least two primary and two secondary signals for driving four adjacent antennas of the plurality of antennas;
- a second set of signals including at least two primary and two secondary signals for driving four adjacent antennas of the plurality of antennas;
- wherein the first and second sets of signals are coupleable to diametrically located antennas to simultaneously drive two sets of at least four adjacent antennas such that each set of antennas are substantially diametrically located on the circle.

The system preferably comprises a means for dynamically selectively coupling each primary and secondary signal to an antenna of the plurality of antennas, such that the source of the combined transmission is transitionable in a substantially continuous cycle about the circumference of the circle.

Preferably, the distortion arises from the juxtaposition of the plurality of antennas. More preferably, the distortion arises from simultaneous transition from two or more antennas of the plurality of antennas. Most preferably, the distortion includes AM modulation of the combined transmission observed at the receiving device.

The frequency generator unit is preferably further adapted to generate a respective reference signal for driving an antenna to provide a reference transmission.

Preferably, the frequency generator unit is preferably adapted to dynamically control phase, frequency and amplitude of each of the primary and secondary signals. More preferably, the frequency generator unit includes a plurality of numerically controlled oscillators for actively independently generating each of the primary and secondary signals. Most preferably, the numerically controlled oscillators enables digital control of the generated signal phase, frequency and amplitude. Control of each numerically controlled oscillators is preferably derived with reference to a substantially stable reference clock signal. The stable reference clock signal is preferably provided by a stable temperature compensated clock circuit.

The navigational indicator is preferably a directional indicator relative to the plurality of antennas.

According to a second aspect of the invention there is provided a system for allowing a receiving device to calculate a navigational indicator relative to a plurality of antennas, the system comprising:
- a radio frequency generator unit adapted to generate at least two primary signals for independently driving a first pair of adjacent antennas of the plurality of antennas to provide a primary transmission;
- wherein the frequency generator unit separately applies a predetermined blending function to each of the primary signals for transitioning the principal source of the primary transmission from one antenna to another adjacent antenna in the first pair of antennas such that the primary transmission, relative amplitude blending only, provides a reduced observed distortion at the receiving device.

Preferably, the distortion arises from the juxtaposition of the plurality of antennas. More preferably, the distortion arises from simultaneous transition from two or more antennas of the plurality of antennas. Most preferably, the distortion includes AM modulation of the combined transmission observed at the receiving device.

The frequency generator unit is preferably further adapted to generate a respective reference signal for driving an antenna to provide a reference transmission.

Preferably, the frequency generator unit is adapted to dynamically control phase, frequency and amplitude of each of the primary signals. More preferably, the frequency generator unit includes a plurality of numerically controlled oscillators for actively independently generating each of the primary signals. Most preferably, each numerically controlled oscillators enables digital control of each of the primary signals phase, frequency and amplitude.

The navigational indicator is preferably, a directional indicator relative to the plurality of antennas.

According to a third aspect of the invention there is provided a system for allowing a receiving device to calculate a navigational indicator relative to a plurality of antennas, the system comprising a radio frequency generator unit adapted to actively independently generate a first set of at least four signals for driving respective antennas of the plurality of antennas to provide a first combined transmission; wherein the first combined transmission, relative to the transmission from one of the driven antennas, provides a reduced observed distortion at the receiving device.

Preferably, the plurality of antennas are arranged circumferentially about a circle, wherein the frequency generator unit is adapted to actively independently generate a second set of at least four signals for driving respective antennas of the plurality of antennas to provide a second combined transmission, wherein the first and second sets of signals are coupleable to substantially diametrically located antennas to simultaneously drive two sets of at least four adjacent antennas such that each set of antennas are substantially diametrically located on the circle.

Preferably, the frequency generator unit separately applies a predetermined blending function to pre-selected signals of each set for transitioning the principal source of the respective combined transmission about the circumference of the circle.

The signals are preferably dynamically selectively coupleable to antennas of the plurality of antennas, such that respective combined transitions are transitionable in a substantially continuous cycle about the circumference of the circle.

Preferably, the distortion arises from the juxtaposition of the plurality of antennas. More preferably, the distortion arises from simultaneous transition from two or more antennas of the plurality of antennas. Most preferably, the distortion includes AM modulation of the combined transmission observed at the receiving device.

The frequency generator unit is further adapted to generate a respective reference signal for driving an antenna to provide a reference transmission. Preferably, the frequency generator unit is adapted to dynamically control phase, frequency and amplitude of each signal in each of the set of signals. More preferably, the frequency generator unit includes a plurality of numerically controlled oscillators for actively independently generating each signal in each of the set of signals. Most preferably, each numerically controlled oscillators enables digital control of the generated signal phase, frequency and amplitude. The control of each numerically controlled oscillators is preferably derived with reference to a substantially stable reference clock signal. The substantially stable reference clock signal is preferably provided by a stable temperature compensated clock circuit.

The navigational indicator is preferably a directional indicator relative to the plurality of antennas.

According to a fourth aspect of the invention there is provided a system for allowing a receiving device to calculate a navigational indicator relative to a plurality of circumferentially spaced antennas, the system comprising a radio frequency generator unit adapted to actively independently generate a plurality of signals for respectively driving at least four adjacent antennas of the plurality of antennas;

wherein the frequency generator unit is adapted to generate at least two primary signals for independently driving a first pair of adjacent antennas of the plurality of antennas to provide a primary transmission;

wherein the frequency generator unit is adapted to generate at least two secondary signals actively derived to complement the primary signals for driving two antennas of the plurality of antennas, such that the first pair of adjacent antennas are disposed between the antennas of the second pair; the secondary signals provide, collectively with the primary transmission, a combined transmission; and wherein the combined transmission, relative to the primary transmission only, provides a reduced observed distortion at the receiving device.

The frequency generator unit preferably separately applies a predetermined blending function to each of the primary signals for transitioning the principal source of the primary transmission from one antenna to another adjacent antenna in the first pair of antennas.

Preferably, the distortion arises from the juxtaposition of the plurality of antennas. More preferably, the distortion arises from simultaneous transition from two or more antennas of the plurality of antennas. Most preferably, the distortion includes AM modulation of the combined transmission observed at the receiving device.

The frequency generator unit is preferably further adapted to generate a respective reference signal for driving an antenna to provide a reference transmission. More preferably, frequency generator unit is adapted to dynamically control phase, frequency and amplitude of each of the primary and secondary signals. Most preferably, the frequency generator unit includes a plurality of numerically controlled oscillators for actively independently generating each of the primary and secondary signals. Each numerically controlled oscillator preferably enables digital control of the generated signal phase, frequency and amplitude. Control of each numerically controlled oscillator is preferably derived with reference to a substantially stable reference clock signal. The substantially stable reference clock signal is preferably generated by a stable temperature compensated clock circuit.

The navigational indicator is preferably a directional indicator relative to the plurality of antennas.

According to a fifth aspect of the invention there is provided a system for generating a doppler very high frequency omni-directional range (D-VOR) air navigation signal comprising:

a radio frequency generator unit for actively generating a plurality of signals, an antenna distribution system (ADS) coupled to the frequency generator unit;

a plurality of circumferentially located omni-directional sideband antennas;

a centrally located reference antenna;

wherein the antenna distribution system is adapted to selectively drives diametrically located predetermined sets of the sideband antennas.

The antenna distribution system preferably selectively drives the sideband antennas in a manner to simulate rotation of two sets of opposite antennas around the circumference.

Preferably, the air navigation signal is a double sideband Doppler very high frequency omni-directional range signal. More preferably, the air navigation signal is an alternating sideband Doppler very high frequency omni-directional range signal.

Preferably, the sideband antennas are driven actively, and dynamically, such that coupling effect of adjacent antennas (multiple antennas radiating simultaneously) on the radiation pattern associated with the combined transmission is reduced, relative to driving a single sideband antenna. More preferably, the sideband antennas are driven actively, and dynamically, such that amplitude modulation associated with the combined transmission is reduced, relative to driving a single sideband antenna.

Each set of antennas preferably includes four or more antennas.

Preferably, the frequency generator unit is adapted to dynamically control phase, frequency and amplitude of each of the primary and secondary signals.

The frequency generator unit preferably includes a plurality of numerically controlled oscillators having digitally controlled phase, frequency and amplitude outputs. Each numerically controlled oscillators preferably has an output in which the phase, frequency and amplitude is digitally controlled. Digital control of the numerically controlled oscillators is preferably derived from one or more stable temperature compensated clock circuits.

The navigational indicator is preferably a directional indicator relative to the plurality of antennas.

According to a sixth aspect of the invention there is provided a method of generating a radio frequency signal adapted for allowing a receiving device to calculate a navigational indicator relative to a plurality of antennas, the method comprising the steps of:

(a) generating at least one primary signal for driving a respective at least one antenna of the plurality of antennas to provide a primary transmission; and (b) generating at least one compensating secondary signal actively derived to complement the primary signal for driving a respective at least one other antenna of the plurality of antennas to provide, collectively with the primary transmission, a combined transmission, for transmitting to a respective antenna;

wherein the combined transmission, relative to the primary transmission only, provides a reduced observed distortion at the receiving device.

Preferably, the plurality of antennas are arranged circumferentially about a circle, the method further comprises the step of: dynamically selectively coupling each primary and secondary signal to an antenna of the plurality of antennas; such that the source of the combined transmission is transitionable in a substantially continuous cycle about the circumference of the circle.

At least two primary signals are preferably generated for independently driving a first pair of adjacent antennas of the plurality of antennas to provide a primary transmission.

Preferably, the method further comprises the step of: separately applying a predetermined blending function to each of the at least two primary signals for transitioning the principal source of the primary transmission from one antenna to another adjacent antenna in the first pair of antennas. More preferably, the method further comprises the step of: dynamically controlling phase, frequency and amplitude of each of the primary and secondary signals.

A plurality of numerically controlled oscillators preferably actively independently generate each of the primary and secondary signals. Each numerically controlled oscillators preferably enables digital control of the generated signal phase, frequency and amplitude.

The method preferably further comprises the step of: generating a reference signal for driving an antenna to provide a reference transmission.

Preferably, the distortion arises from the juxtaposition of the plurality of antennas. More preferably, the distortion arises from simultaneous transition from two or more antennas of the plurality of antennas. Most preferably, the distortion includes AM modulation of the combined transmission observed at the receiving device.

The navigational indicator is preferably a directional indicator relative to the plurality of antennas.

According to a sixth aspect of the invention there is provided a method of generating a radio frequency signal adapted for allowing a receiving device to calculate a navigational indicator relative to a plurality of antennas, wherein the plurality of antennas are arranged circumferentially about a circle, the method comprising the steps of:

(a) generating at least two primary signal for driving a respective at least two antenna of the plurality of antennas to provide a primary transmission; and (b) dynamically selectively coupling each primary signal to an antenna of the plurality of antennas; such that the source of the primary transmission is transitionable in a substantially continuous cycle about the circumference of the circle.

Preferably, the method further comprises the step of: generating at least one compensating secondary signal actively derived to complement the primary signals for driving a respective at least one other antenna of the plurality of antennas to provide, collectively with the primary transmission, a combined transmission, for transmitting to a respective antenna, wherein the combined transmission, relative to the primary transmission only, provides a reduced observed distortion at the receiving device. More preferably, the method further comprises the step of: separately applying a predetermined blending function to each of the at least two primary signals for transitioning the principal source of the primary transmission from one antenna to another adjacent antenna. Most preferably, the method further comprises the step of dynamically controlling phase, frequency and amplitude of each of the primary signals.

A plurality of numerically controlled oscillators preferably actively independently generate each of the primary signals. Each numerically controlled oscillator preferably enables digital control of the generated signal phase, frequency and amplitude.

The method preferably further comprises the step of: generating a reference signal for driving an antenna to provide a reference transmission.

Preferably, the distortion arises from the juxtaposition of the plurality of antennas. More preferably, the distortion arises from simultaneous transition from two or more antennas of the plurality of antennas. Most preferably, the distortion includes AM modulation of the combined transmission observed at the receiving device.

The navigational indicator is preferably a directional indicator relative to the plurality of antennas.

According to a seventh aspect of the invention there is provided computer-readable carrier medium carrying a set of instructions that when executed by one or more processors cause the one or more processors to carry out a method of generating a radio frequency signal adapted for allowing a receiving device to calculate a navigational indicator relative to a plurality of antennas, the method as previously described.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Figure 1:
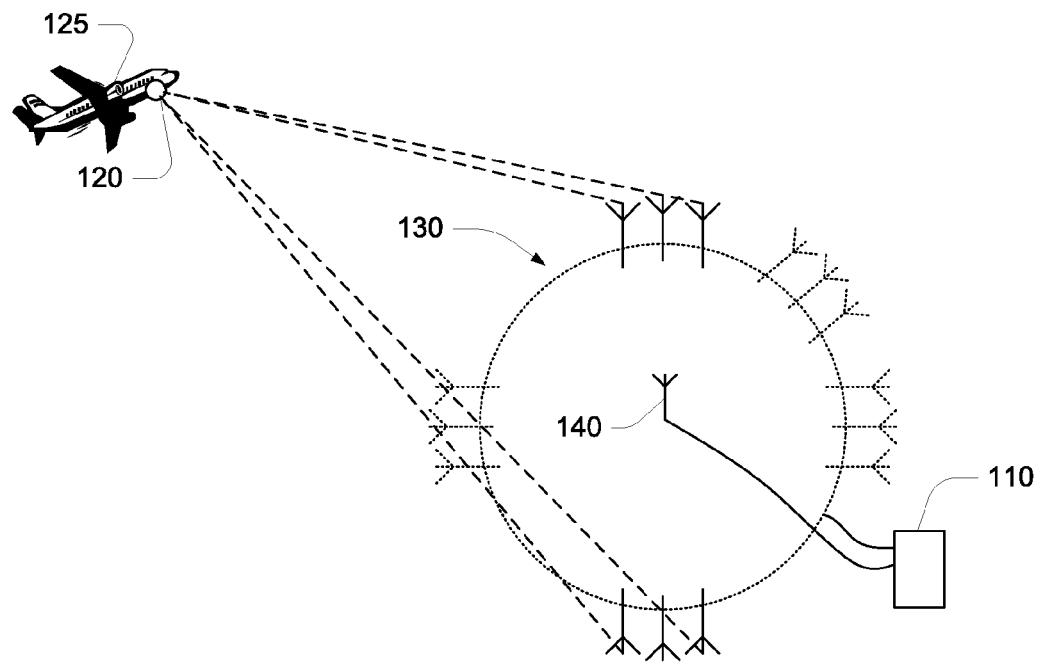
FIG. 1 is a schematic view of a system according to the invention.

In an embodiment, a system for providing a combined transmission for allowing a receiving device to calculate a navigational indicator relative to a plurality of antennas (or electromagnetic radiators) is shown, wherein the combined transmission provides a relatively reduced observed (far field) distortion at a receiving device, when compared to conventional D-VOR Systems. It will be appreciated that for a D-VOR System, the navigational indicator includes a directional indicator relative to a plurality of antennas, which in this example provides a bearing to the plurality of antennas.

Throughout the drawings, corresponding features have been given the same reference numerals. In all embodiments, the system comprises a radio frequency generator unit 110.

In an example embodiment, the system comprises a radio frequency generator unit 110 for generating:
- a primary signal for driving at least one antenna of the plurality of antennas to provide a primary transmission; and
- an actively derived secondary signal to complement the primary signal for driving at least one other antenna of the plurality of antennas to provide, collectively with the primary transmission, the combined transmission,
- wherein the combined transmission, relative to the primary transmission only, provides a reduced observed distortion at the receiving device.

Preferably, the plurality of antennas are arranged circumferentially about a circle, wherein the frequency generator unit is adapted to generate;
- a first set of signals including at least two primary and two secondary signals for driving four adjacent antennas of the plurality of antennas;
- a second set of signals including at least two primary and two secondary signals for driving four adjacent antennas of the plurality of antennas;
- wherein the first and second sets of signals are coupleable to diametrically located antennas to simultaneously drive two sets of at least four adjacent antennas such that each set of antennas are substantially diametrically located on the circle.

More preferably, the frequency generator unit is adapted to generate at least two primary signals for independently driving a first pair of adjacent antennas of the plurality of antennas to provide the primary transmission. The frequency generator unit can be further adapted to separately apply a predetermined blending function to each of the at least two primary signals for transitioning the principal source of the primary transmission from one antenna to another adjacent antenna in the first pair of antennas. Most preferably, the frequency generator unit is adapted to generate at least two secondary signals, wherein each secondary signal is for driving a respective antenna of the plurality of antennas such that the first pair of adjacent antennas is disposed therebetween.

It will be appreciated that a respective blending function is applied to each of the at least two primary signals for transitioning the principal source of the primary transmission from one antenna to another adjacent antenna. This blending function can specify the phase, frequency and amplitude of each of the primary signals as a function of time. The phase, frequency or amplitude can be stored in a computer memory for later lookup by a control unit and/or processor. By applying a respective primary signal to drive two or more adjacent antennas, simultaneously, distortion is introduced in the signal transmitted (or radiated) from this set of antennas. A predetermined, or dynamically calculated, compensation signal can be applied to each primary signal, and the adjacent antennas to each antenna driven by a primary signal, to, at least partially, compensate for this distortion. For example, the compensation can be applied 'vectorially' to each generated primary signal to pre-compensate the primary signal, and also be applied to the otherwise non-driven antennas adjacent to the antennas driven with the primary signals. This compensation can be generated such that the signals applied to the otherwise non-driven antennas and the compensatory adjustments to the primary signals are 180 degrees out of phase with the primary signals.

It will be further appreciated that applying a primary signal to an antenna that is adjacent to another otherwise non-driven antenna, can introduce distortion of the transmitted signal, which is in part caused by the coupling of the non-driven antenna. A predetermined, or dynamically calculated, compensation secondary signal can be used to drive the otherwise non-driven antenna to, at least partially, compensate for, this distortion. For example, this compensation can be generated such that the signal applied to the otherwise non-driven antenna has the same magnitude and is 180 degrees out of phase with the coupled signal. In effect, when the compensation signal is applied to the antenna, the applied signal, and the coupled signal sum 'vectorially', at the antenna. This reduces the signal transmitted (or radiated) by the otherwise non-driven antenna, and thereby reduces the otherwise generated distortion.

In another example embodiment, the system comprises a radio frequency generator unit 110 for generating at least two primary signals for independently driving a first pair of adjacent antennas of the plurality of antennas to provide a primary transmission. The frequency generator unit separately applies a predetermined blending function to each of the primary signals for transitioning the principal source of the primary transmission from one antenna to another adjacent antenna in the first pair of antennas such that the primary transmission provides a reduced observed distortion at the receiving device.

In another example embodiment, the system comprises a radio frequency generator unit 110 for actively independently generating a first set of at least four signals for driving respective antennas of the plurality of antennas to provide a first combined transmission. The first combined transmission, relative to the transmission from one of the driven antennas, provides a reduced observed distortion at the receiving device.

Preferably, the plurality of antennas are arranged circumferentially about a circle, wherein the frequency generator unit is adapted to actively independently generate a second set of at least four signals for driving respective antennas of the plurality of antennas to provide a second combined transmission, wherein the first and second sets of signals are coupleable to substantially diametrically located antennas to simultaneously drive two sets of at least four adjacent antennas such that each set of antennas are substantially diametrically located on the circle.

In another example embodiment, the system allows a receiving device to calculate a navigational indicator relative to a plurality of circumferentially spaced antennas, the system comprising:

a radio frequency generator unit 110 adapted to actively independently generate a plurality of signals for respectively driving at least four adjacent antennas of the plurality of antennas;

wherein the frequency generator unit is adapted to generate at least two primary signals for independently driving a first pair of adjacent antennas of the plurality of antennas to provide a primary transmission;

wherein the frequency generator unit is adapted to generate at least two secondary signals actively derived to complement the primary signals for driving two antennas of the plurality of antennas, such that the first pair of adjacent antennas are disposed between the antennas of the second pair; the secondary signals provide, collectively with the primary transmission, a combined transmission; and wherein the combined transmission, relative to the primary transmission only, provides a reduced observed distortion at the receiving device.

In another example embodiment, a system for generating a Doppler very high frequency omni-directional range (D-VOR) air navigation signal comprises:

a radio frequency generator unit 110 for actively generating a plurality of signals, an antenna distribution system (ADS) coupled to the frequency generator unit;

a plurality of circumferentially located omni-directional sideband antennas;

a centrally located reference antenna;

wherein the antenna distribution system is adapted to selectively drives diametrically located predetermined sets of the sideband antennas.

Typically, in the above example embodiments, the radio frequency generator unit 110 can dynamically control phase, frequency and amplitude of each of the primary and secondary signals. The frequency generator unit can include a plurality of numerically controlled oscillators for actively independently generating each of the primary and secondary signals. Each numerically controlled oscillator enables digital control of the generated signal phase, frequency and amplitude. The control of each numerically controlled oscillator can be derived with reference to a substantially stable reference clock, signal. The radio frequency generator unit 110 can further generate a reference signal for driving an antenna to provide a reference transmission.

The system can comprise a means for dynamically selectively coupling each primary and secondary signal to an antenna of the plurality of antennas, such that the source of the combined transmission is transitionable in a substantially continuous cycle about the circumference of the circle.

It will be appreciated that distortion arises from the juxtaposition of the plurality of antennas. Further, the distortion can arise from simultaneous transition from two or more antennas of the plurality of antennas. The distortion can include AM modulation of the combined transmission observed at the receiving device.

Referring to FIG. 1, the system allows a receiving device 120, typically installed in aircraft 121, to calculate a navigational indicator relative to a plurality of antennas 130. The plurality of antennas 130 (or antenna array) used in a D-VOR system is typically arranged circumferentially about a circle. A reference antenna 140 is typically located proximal to the centre of the circle, and is adapted to transmit a reference signal to thereby provide a reference transmission.

Figure 2A:
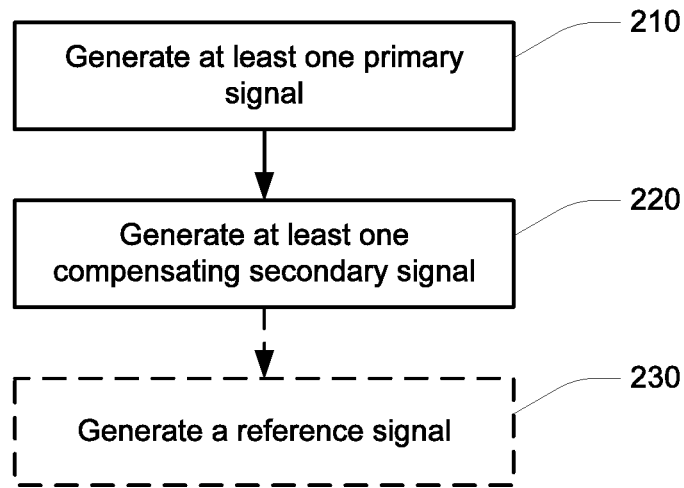
FIG. 2A is an example flow chart of a method according to the invention.

FIG. 2A shows a flowchart for an example method of generating a radio frequency signal adapted for allowing a receiving device to calculate a navigational indicator relative to a plurality of antennas. The method comprises the steps of:

(a) generating at least one primary signal 210 for driving at least one respective antenna of the plurality of antennas to provide a primary transmission;

(b) generating at least one compensating secondary signal 220 actively derived to complement the primary signal for driving at least one other respective antenna of the plurality of antennas to provide, collectively with the primary transmission, a combined transmission, for transmitting to a respective antenna; and wherein the combined transmission, relative to the primary transmission only, provides a reduced observed distortion at the receiving device.

The method can further comprise the step of: generating a reference signal 230 for driving an antenna to provide a reference transmission. In this example, the navigational indicator is a directional indicator relative to the plurality of antennas.

Figure 2B:
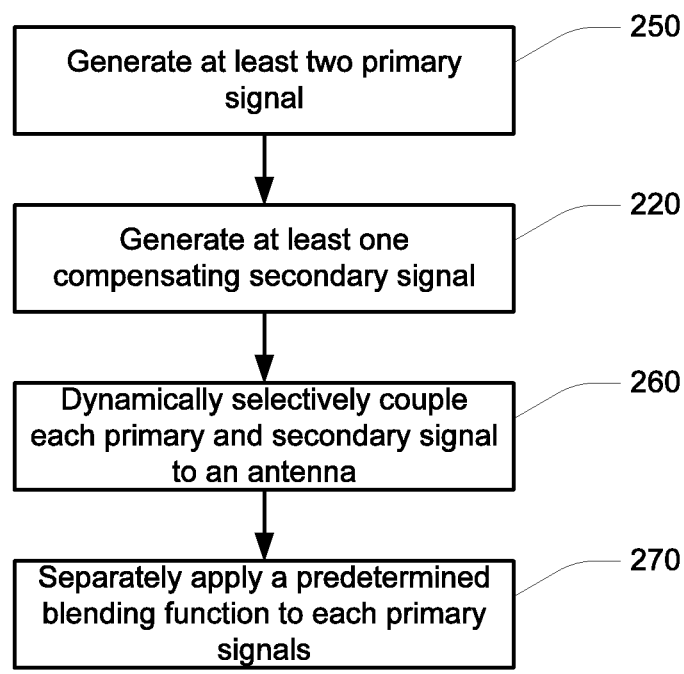
FIG. 2B is an example flow chart of a method according to the invention.

FIG. 2B shows a flowchart depicting another embodiment of a method of generating a radio frequency signal adapted for allowing a receiving device to calculate a navigational indicator relative to a plurality of antennas. This method comprises the steps of:

(a) generating at least two primary signals 250 for independently driving a first pair of adjacent antennas of the plurality of antennas to provide a primary transmission;

(b) generating at least two compensating secondary signals 220 actively derived to complement the primary signal for driving at least two other respective antennas of the plurality of antennas to provide, collectively with the primary transmission, a combined transmission, for transmitting to two respective antennas;

(c) dynamically selectively coupling each primary and secondary signal to an antenna 260 of the plurality of antennas; such that the source of the combined transmission is transitionable in a substantially continuous cycle about the circumference of the circle;

(d) separately applying a predetermined blending function 270 to each of the at least two primary signals for transitioning the principal source of the primary transmission from one antenna to another adjacent antenna in the first pair of antennas; and wherein the combined transmission, relative to the primary transmission only, provides a reduced observed distortion at the receiving device.

Figure 2C:
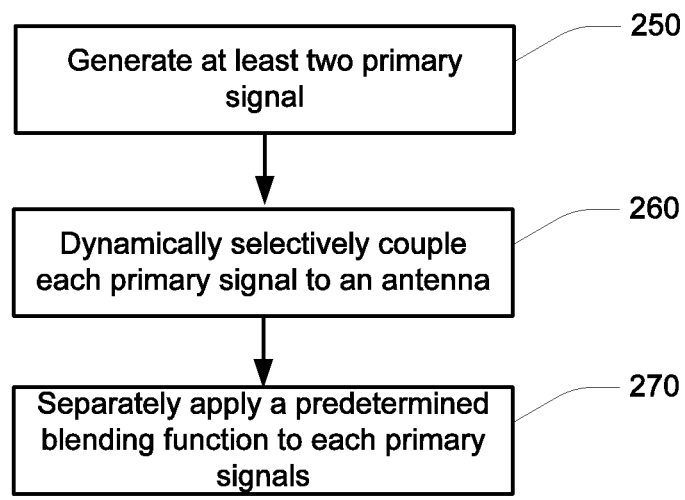
FIG. 2C is an example flow chart of a method according to the invention.

FIG. 2C shows a flowchart depicting another embodiment of a method of generating a radio frequency signal adapted for allowing a receiving device to calculate a navigational indicator relative to a plurality of antennas. This method, wherein the plurality of antennas are arranged circumferentially about a circle, comprises the steps of:

(a) generating at least two primary signal 250 for driving a respective at least two antenna of the plurality of antennas to provide a primary transmission; and (b) dynamically selectively coupling each primary signal 260 to an antenna of the plurality of antennas; such that the source of the primary transmission is transitionable in a substantially continuous cycle about the circumference of the circle.

This method can preferably further comprise the step of: separately applying a predetermined blending function to each of the at least two primary signals 270 for transitioning the principal source of the primary transmission from one antenna to another adjacent antenna.

This method can further comprise of the step of: generating at least two compensating secondary signals actively derived to complement the primary signals for driving at least two other respective antennas of the plurality of antennas to provide, collectively with the primary transmission, a combined transmission, for transmitting to at least two other respective antennas, wherein the combined transmission, relative to the primary transmission only, provides a reduced observed distortion at the receiving device.

When the plurality of antennas can be arranged circumferentially about a circle, the method further comprises the step of: dynamically selectively coupling each primary and secondary signal to an antenna of the plurality of antennas; such that the source of the combined transmission is transitionable in a substantially continuous cycle about the circumference of the circle.

A predetermined blending function to each of at least two primary signals for transitioning the principal source of the primary transmission from one antenna to another adjacent antenna.

The method can further comprise the step of: dynamically controlling phase, frequency and amplitude of each of the primary and secondary signals. A plurality of numerically controlled oscillators can be used actively independently to generate each of the primary and secondary signals. These numerically controlled oscillators can enable digital control of the generated signal phase, frequency and amplitude.

It will be appreciated that distortion can arise from the juxtaposition of the plurality of antennas in the form of coupling and/or simultaneous transition from two or more antennas of the plurality of antennas. The distortion includes AM modulation of the combined transmission observed at the receiving device.

Conventional D-VOR systems radiate RF signals containing both AM and FM modulation. These systems have sources of unintentional AM modulation that interfere with (or can reduce the accuracy of) the received signals. Two sources of unintentional modulation result from the use of simultaneously radiating antennas to simulate a moving signal, and the coupling of one antenna to adjacent antennas.

It will be appreciated that, FM modulation of sidebands in conventional dual-sideband D-VOR systems, radiate both a reference signal and a pair of sideband signals. One sideband signal is 9960 Hz below the carrier frequency and the other is 9960 Hz above the carrier frequency. The Doppler effect is used to apply an FM modulation to these two sidebands, and this FM modulated signal provides the signal that is used to provide a bearing signal for an aircraft. Ideally these sideband signals should have constant amplitude when received in the far field, but it has been observed that the received signal amplitude typically varies with time.

Figure 3:
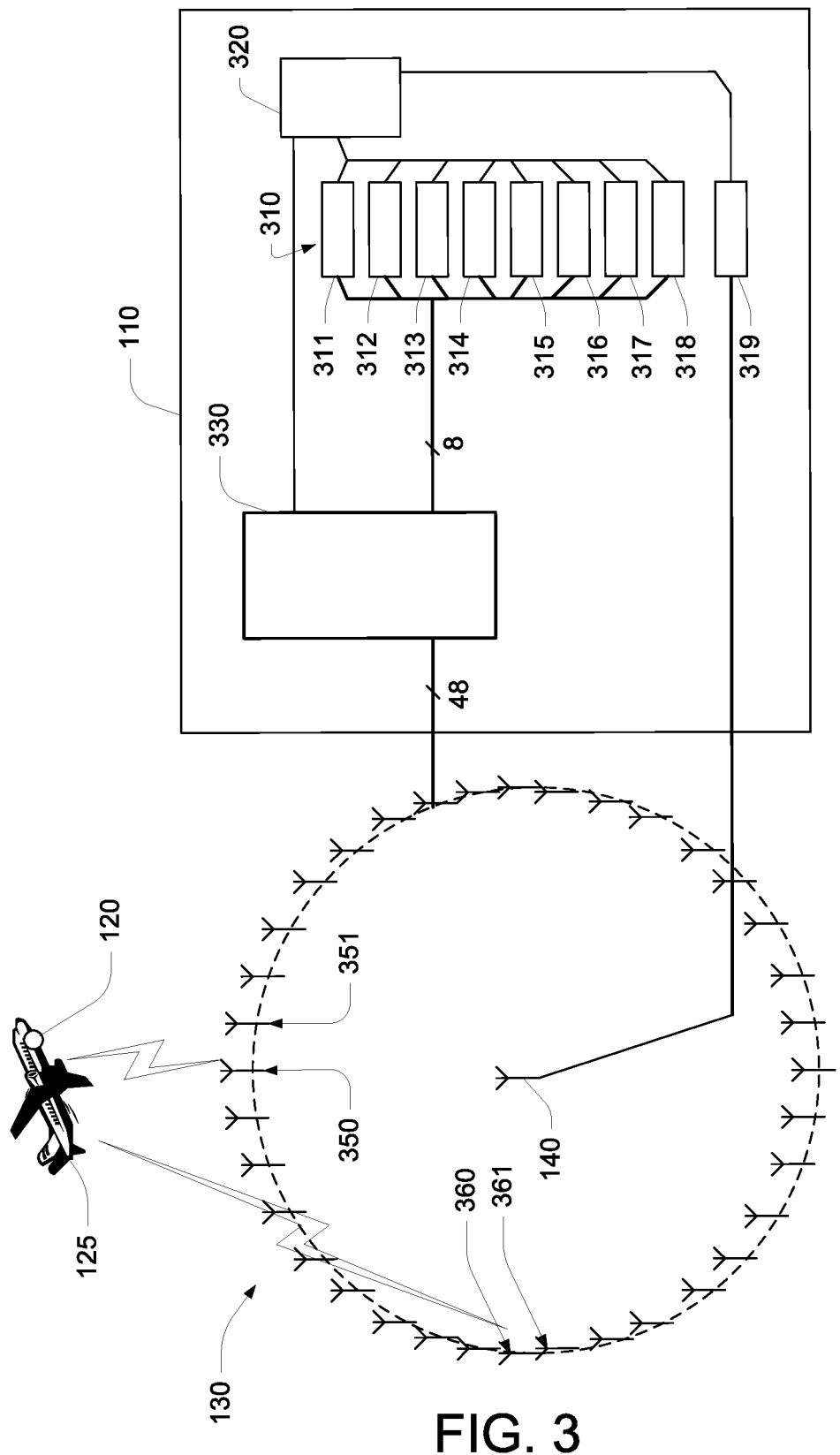
FIG. 3 is a schematic view of a system according to the invention.

Referring to FIG. 3, an example embodiment of a D-VOR system is shown. The D-VOR system comprises: a radio frequency generator unit 110; an antenna array including 48 circumferentially located antennas 130; and a reference antenna 140 located proximal to the centre of the circular antenna array.

The radio frequency generator unit 110 further includes a plurality of numerically controlled oscillators 310 for actively independently generating each of a plurality of primary and secondary signals. Each numerically controlled oscillator enables digital control of the generated signal phase, frequency and amplitude of the respective signals. Preferably, radio frequency generator unit includes nine or more numerically controlled oscillators with digitally scalable outputs.

The radio frequency generator unit 110 further includes a switching means, in the form of an RF switching unit 330, for dynamically selectively coupling each primary and secondary signal to an antenna of the plurality of antennas.

A control unit 320 can be provided to control the numerically controlled oscillators and switching means. The control unit can further apply a blending to the primary signals, and calculate the actively derived secondary signals to complement the primary signals. These calculations (typically determining both phase, and amplitude, as a function of time) can be predetermined and stored or can be performed dynamically. Typically the resultant values are stored in the form of a table, which is accessible by the control unit. The control unit typically includes a processor programmed to perform a method of generating a radio frequency signal.

In this example, there are nine numerically controlled oscillators (311 to 319) for generating RF signals. One numerically controlled oscillator 319 generates a respective reference signal for driving a reference antenna 140 to provide a reference transmission. The remaining eight numerically controlled oscillator 311 to 318 are coupled to the switching unit.

It will be appreciated that the control of each numerically controlled oscillator can be derived with reference to a substantially stable reference clock signal. This reference clock signal is typically derived from a stable temperature compensated clock circuit.

The switch unit 330, included in the radio frequency generator unit 110, is coupled to all 48 circumferentially located antennas 130, for driving a selected antenna with a signals generated by a respective one of eight numerically controlled oscillator 311 to 318.

According to an embodiment, the switching unit couples a first set of signals to drive a set of at least four adjacent antennas of the plurality of antennas, and couples a second set, of signals to drive another four adjacent antennas of the plurality of antennas, wherein the first and second sets of signals are coupleable to diametrically located antennas to simultaneously drive two sets of at least four adjacent antennas such that each set of antennas are substantially diametrically located on the circle. More preferably, the switching unit dynamically selectively couples each signal to a respective antenna of the plurality of antennas, such that the source of the combined transmission associated with each set of signals is transitionable in a substantially continuous cycle about the circumference of the circle.

In use, by way of example only, the outputs from the nine numerically controlled oscillators (311 to 319) are then amplified, such that the level of power sent to the sideband antennas is significantly less than the level sent to the reference antenna. This is so that the two sideband signals model the sidebands which would be generated by amplitude modulating the sub-carrier on the reference signal (i.e. as provided by a conventional VOR). This amplitude modulation is at a nominal level of 30%, implying that each sideband would have a relative amplitude of 15% with respect to the reference. Because power is proportional to the square of amplitude, it means that each sideband only has 2.25% of the power sent to the reference antenna.

N represents the number of sideband antennas (outer array), which in this example is 48. At N×30 times per second, the radio frequency generator unit 110 (or more specifically the switch unit 330) decouples one antenna from its signal source, and couples an antenna that is further along the circumference. Preferably, the newly coupled antenna is four or more antennas further along the circumference.

The radio frequency generator unit 110 will apply compensating signals to two antennas, whilst applying a blending function to the other two antennas moving from an initial state where most signal is radiated from only one antenna, until most signal is being radiated from the next antenna. This process is repeated N times per 30 Hz cycle.

For each driven antenna, the radio frequency generator unit 110 can perform "micro-adjustments" to both the phase and amplitude of the signal sent. This will compensate for individual differences in the gain and phase from the amplifiers to the radiated levels transmitted from each antenna.

The resultant D-VOR combined transmission signal can simultaneously compensate for antenna radiation, coupling and differences resulting from individual elements of hardware. The combined transmission signal can reduce unintentional amplitude modulation.

Figure 4A:
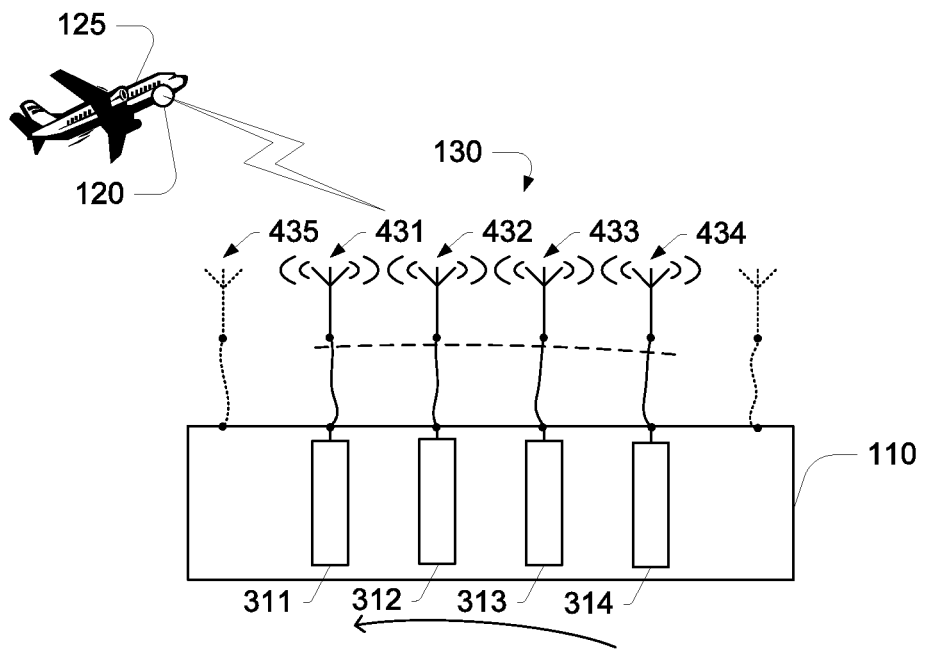
FIGS. 4A, 4B, and 4C are schematic views of a portion of system according to the invention, showing the transition of a signal from one antenna to an adjacent antenna.
Figure 4B:
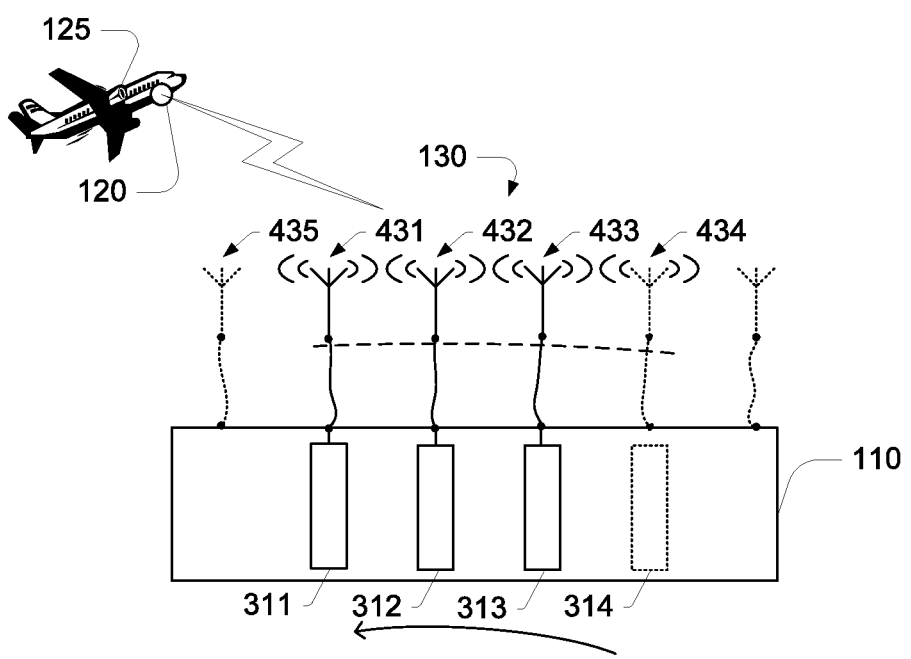
Figure 4C:
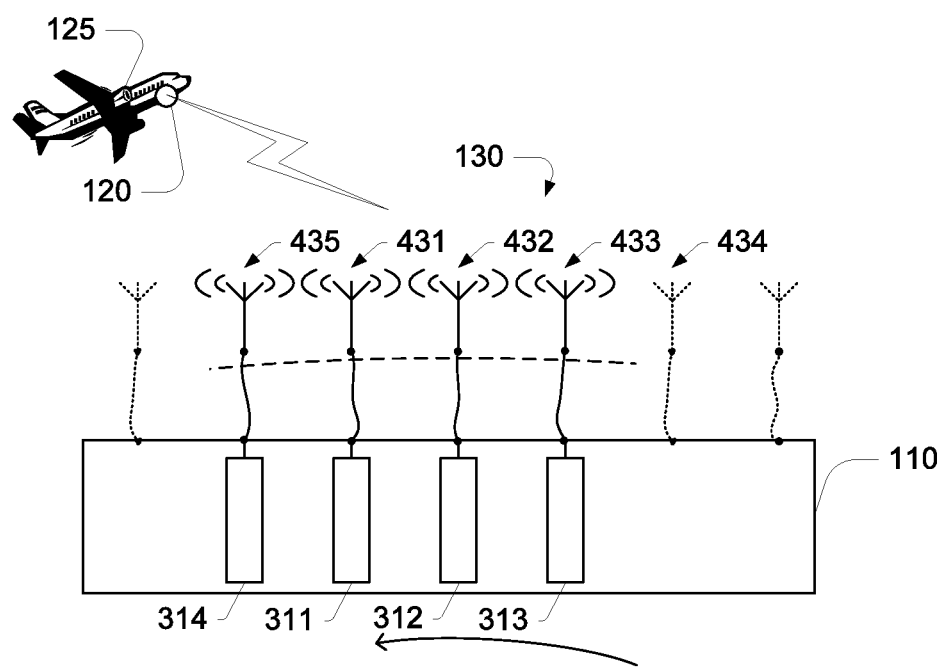

Referring to FIGS. 4A, 4B and 4C, the radio frequency generator unit 110 is shown including four of the numerically controlled oscillators (311, 312, 314, 314).

FIG. 4A shows the numerically controlled oscillators (311, 312, 314, 314) coupled to four, respective sideband antennas (431, 432, 433, 434). In this example antenna 432 and antenna 433 are each driven by a primary signal to provide a primary transmission. Antenna 431 and antenna 434 are each driven by an actively derived secondary signal to complement the primary signal to provide, collectively with the primary transmission, the combined transmission. The combined transmission, relative to the primary transmission only, provides a reduced observed distortion at the receiving device.

The radio frequency generator unit (110) is adapted to separately apply a predetermined blending function to each primary signal driving respective antennas 432 and 433. This blending function transitions the principal source of the primary transmission from one antenna to another adjacent antenna. In this example, the blending function transitions the signals driving antennas 432 and 433, from an initial state where antenna 433 is providing most of the primary transmission, until antenna 432 is providing most of the primary transmission. This process is repeated N times per 30 Hz cycle.

Referring to FIG. 4B, once the primary transmission, has been transitioned to antenna 432, the radio frequency generator unit 110, (or more specifically the switch unit 330) couples the signal source from antenna 434.

Referring to FIG. 4C, the radio frequency generator unit 110, (or more specifically the switch unit 330) then couples an antenna that is further along the circumference. In this example, the newly coupled antenna 435 is four antennas further along the circumference.

It will be appreciated that the numerically controlled oscillators (311, 312, 314, 314) coupled to four respective sideband antennas (431, 432, 433, 435). In this example antenna 431 and antenna 432 are each driven by a primary signal to provide a primary transmission. Antenna 435 and antenna 433 are each driven by an actively derived secondary signal to complement the primary signal to provide, collectively with the primary transmission, the combined transmission. In use this process is repeated N times per 30 Hz cycle.

A D-VOR system consists of a reference antenna that radiates a reference phase signal and a plurality of antennas arranged in a ring that radiate a variable phase signal. Because the ring is a complex array of antennas, there is resultant distortion and amplitude modulation of the radiated variable phase signal. This distortion can result in a reduced accuracy of the total signal produced and thus the signal received.

Causes of this distortion (in the form of amplitude modulation) include,
    antenna radiation pattern distortion as a result of two adjacent antennas simultaneously radiating, and
    coupling of a transmitted signal from one antenna to adjacent antennas.

Whilst the former induces some higher frequency components, both are major contributors to the 60 Hz amplitude modulation that are typically associated with current D-VOR sideband signals.

To provide a smooth transition of the phase from one antenna to the other, two adjacent antennas need to be simultaneously driven (or excited). This movement starts with only a first antenna radiating, and the adjacent second antenna not radiating. Over time the signal level provided to the first antenna is reduced whilst the signal level provided to the second antenna is increased. Ultimately the signal transitions to the second antenna, where no signal is provided to the first antenna and only the second antenna is radiating. At this point in time, a switching system disconnects the first antenna, and connects the next antenna to commence the cycle again. It will be appreciate that, in another embodiment, 'M' antennas can be simultaneously driven and upon signal transition from one or more antennas to others in the 'M' antennas, a switching system can disconnect an un-powered antenna, and be connected to the next M-th antenna to commence the cycle again.

It will be appreciated that, while the signal is transitioning between antennas, ie when both antennas are radiating, the resulting antenna radiation pattern is elongated in the radial direction, and flattened in the tangential direction. This is due to constructive interference of the two signals radially, and destructive interference tangentially. The resultant antenna pattern distortion is dynamic and changes as the relative amplitudes between the two radiating signals change. The highest antenna radiation pattern distortion occurs when two adjacent antennas radiate at equal signal power. Compensation signals can be applied dynamically, to the antennas to, at least in part, reduce this antenna radiation pattern distortion. This compensation signal can be applied to the antennas that are adjacent to each of the two antennas.

It will be further appreciated that, when one antenna radiates, while an adjacent antennas are not radiating—the adjacent non-radiating antenna couples to the radiating antenna to reflect, absorb and reradiate signals in response to the radiated signal. This causes an unwanted signal distortion in the composite antenna radiation pattern. This distortion also elongates the antenna pattern radially and flattens the antenna pattern tangentially. However it will be appreciated that, unlike the previous case, this source of antenna radiation pattern distortion is substantially static.

Referring to FIG. 3, the signals radiated by the omnidirectional antennas 350 and 351 require substantially the same time to travel to a receiver 120 looking in a direction perpendicular to the circle. Thus, in the direction of the receiver, the radiation patterns of the antennas of a pair are superposed on each other and in phase. However, to simulate rotation of antenna pairs, the antennas 360 and 361, at 90° to antennas 350 and 351, are driven (or activated). The signals radiated by the antennas 360 and 361 have different transit times to the Receiver 1, which results in the superposed radiation patterns of the antennas 360 and 361 differing in phase. Due to the juxtaposition of the antennas, and the corresponding superposition of antenna patterns for each pair, the signal received by the receiver has different amplitudes depending on whether it was radiated by the antenna pair 350 and 351 or antenna pair 360 and 361. The same applies analogously to the antenna pairs at diametric location on the circle to these pairs. Consequently, as the signal rotates around the circle, the signal received is amplitude modulated at twice the rotation rate of the antenna (or 60 Hz). It will be appreciated that, in this configuration, antennas 350 and 351 are not typically simultaneously driven with antennas 360 and 361

It will also be appreciated that, as the relative amplitudes of the signals at antennas 350 and 351 change with respect to each other, the resultant antenna pattern also changes. Similarly as the relative amplitudes at antennas 360 and 361 change with respect to each other, the resultant antenna pattern also changes.

Each antenna circumference; as well as the central reference antenna, has an omni-directional radiation pattern, when radiating in isolation of other antennas. However, when a signal is radiated from an omni-directional antenna that is in close proximity to other like antennas, the effective antenna pattern is no longer omni-directional.

For a 113 MHz signal, the distance between antennas in a ring of 48 antennas is 0.8836 meters, and the wavelength in free space is 2.65 meters. The distance between antennas is the equivalent of a phase shift of 119.8 degrees. At 108 MHz, the phase shift is 114.5 degrees and at 118 MHz the phase shift is 125.1 degrees. When there are 50 antennas, the phases are similar.

For simplicity of the following example, the separation of two adjacent antennas is approximated as 120 degrees. When the two antennas are radiating equal amplitudes, and using sin(t) blending, each antenna has an amplitude which is $1/\sqrt{2}$ of the amplitude when compared to only one antenna radiating.

In the radial direction, the two signals from the two antennas 350 and 351 are in phase, and the resulting magnitude doubles. That is, the amplitude in the radial direction is $2/\sqrt{2} = \sqrt{2}$ (or 3 dB) higher.

From antennas 360 and 361, in the tangential direction, the resulting signal strength is equal to:

$$\sqrt{(1 + \cos(120°)2 + \sin 2(120°))} / \sqrt{2} = \frac{1}{\sqrt{2}}$$

Therefore, in the tangential direction, there is a 3 dB attenuation.

An effect of this distortion is to create sinusoidal shaped amplitude "pulses" in the antenna radiation pattern that increase the signal radially to the ring, and decrease the amplitude tangentially. Each pulse has a period of $1/(30\times48) = 694.4\mu$ seconds, corresponding to 1440 Hz. Note that for 50 circumferential antennas the pulses, would be $1/(30\times50) = 666.7\mu$ seconds apart, and have a corresponding frequency of 1500 Hz.

Figure 8:
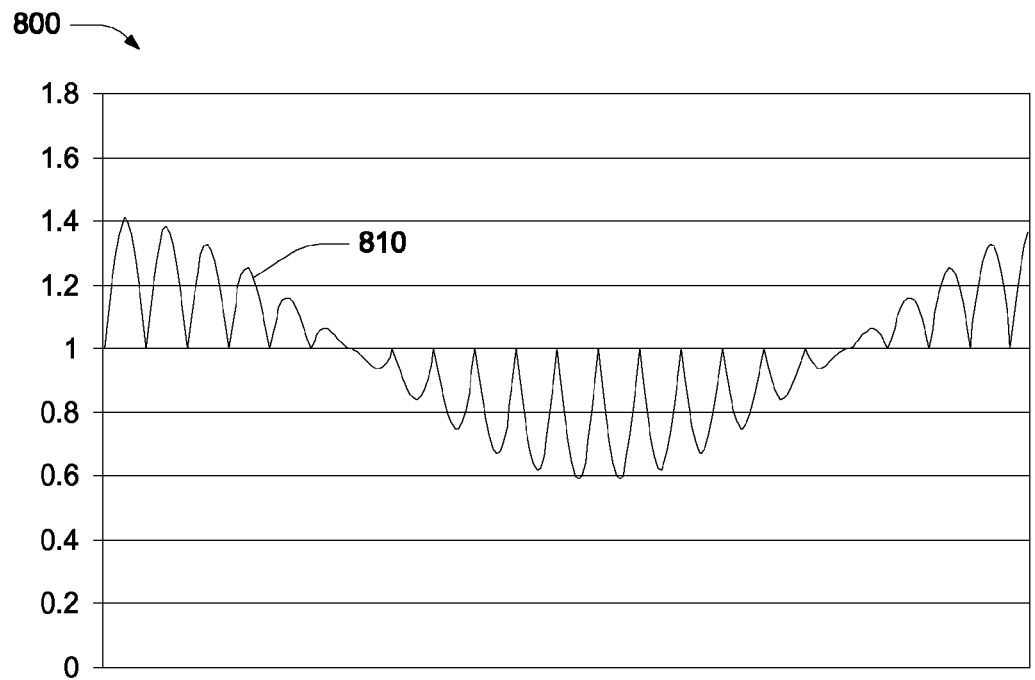
FIG. 8 is graph that illustrates aspects of amplitude modulation as a result of antenna pattern distortion.

FIG. 8 illustrates the 1440 Hz (or similarly, 1500 Hz) amplitude modulation. It will be appreciated that the mean value of these pulses is an amplitude modulation of 60 Hz. The frequency is 60 Hz, as there are two positive peaks, and two negative peaks per 30 Hz cycle. This 1440 Hz component on the amplitude modulation has a significantly high frequency so that it does not cause substantial problems at the receiver. In the aircraft receiver this 1440 Hz amplitude distortion is substantially removed by filtering. After filtering, a 60 Hz component remains.

Referring to FIG. 3, when then antennas 360 and 361 are transmitting, the amplitude of the signal received reduces at the midpoint between pairs of antennas to a minimum relative amplitude of $1/\sqrt{2}$. When the antennas 350 and 351 are transmitting the amplitude of the signal received will be have a relative amplitude of $\sqrt{2}$. The mean value of these pulses will be $2/\pi$ times the peak, so that whilst the peak positive going amplitude is $\sqrt{2}$, the mean can be expressed mathematically as $(1+(\sqrt{2}-1)\times 2/\pi)$, and the negative going mean can be expressed mathematically as $(1+(1/\sqrt{2}-1)\times 2/\pi)$.

In this example, the resulting mean contribution to the amplitude modulation index is 22.5%. This effect has a significant contribution to the apparent amplitude modulation of the sub-carrier.

Unintentional modulation (or distortion) is further provided by another effect typically referred to as coupling. Coupling occurs when an antenna radiates RF energy, which is then reflected, absorbed, or reradiated by adjacent antennas. The reflected or reradiated signal is attenuated and phase-shifted from the original signal. The overall effect of coupling is to distort the omni-directional antenna radiation pattern. The result of this is that, the assumption that an individual antenna in the ring radiates omni-directionally is not correct. The contribution of coupling to the total distortion is similar to the effect of the other causes described above.

The effect of coupling is virtually the same as the antenna pattern distortion caused by two antennas radiating, when consideration is taken for the amplitude and phase of the reflected signal. The effect typically increases the signal level transmitted radially and decreases the signal level transmitted tangentially.

Figure 9:
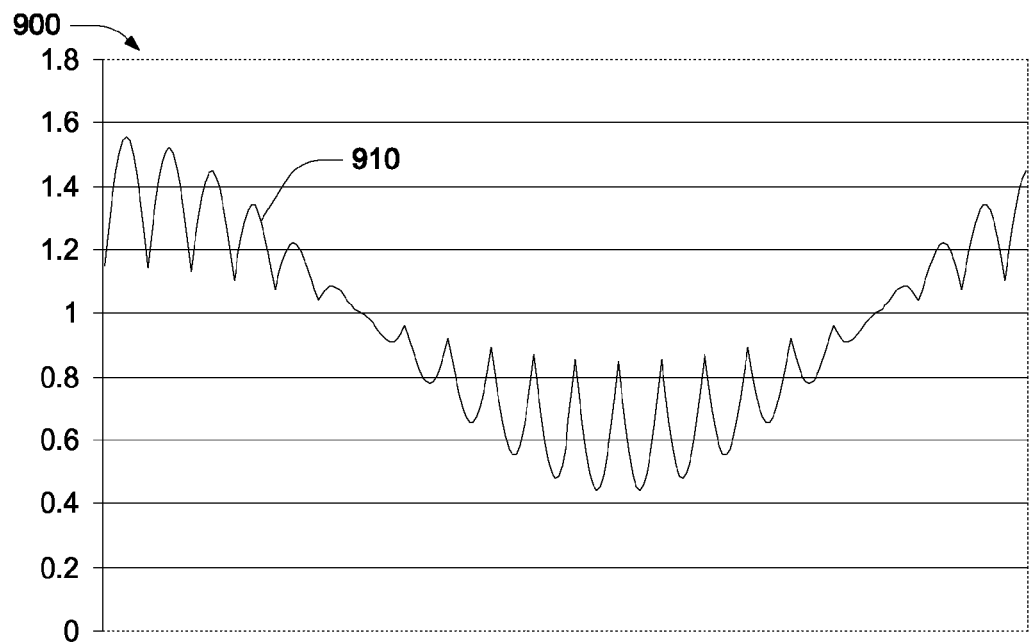
FIG. 9 is graph that illustrates aspects of amplitude modulation as a result of antenna coupling.

FIG. 9 shows signal strength as a function of relative angle from the antennas. The graph 910, when compared with the graph 810, indicates an effect of the coupling is to increase the lowest level of the high region, and decrease the highest points of the lowest region.

Figure 5:
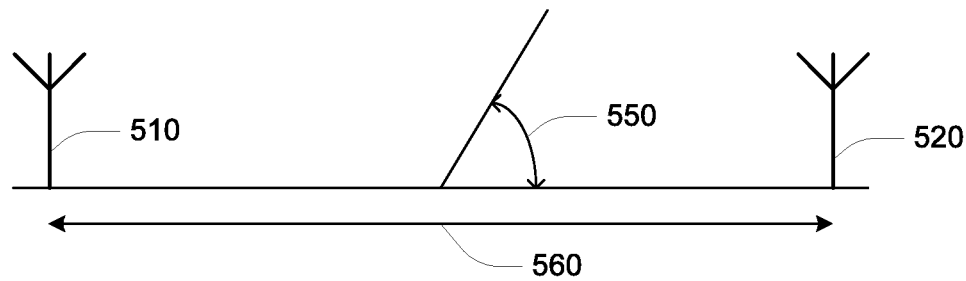
FIG. 5 is a schematic view of two antennas.

Consideration can be had for the relative amplitude of signals radiated from two antennas. Referring to FIG. 5, the power of a signal received from a pair of antennas, separated by a distance D 560, will depend upon the signal power of each antenna 510 and 520, and the angle θ 550.

In this example, the amplitude of the signal transmitted from the antenna 510 is "A" (A<=1), relative to the amplitude of signal transmitted from the antenna 520—which is set as unity. The signal transmitted from antenna 520 has the same phase and frequency as that being transmitted by antenna 510.

The signal received at a location in the direction θ from the antennas, consists of the signal transmitted, from antennas 510 and 520, whose respective phase difference is determined, in part, by the difference in distance travelled from that antenna. The difference in distance can be expressed as $D\times\cos(\theta)$. The phase shift caused by the wave, having wavelength λ, travelling this distance is $(2\times\pi\times D\times\cos(\theta))/\lambda$.

As the two signals are at the same frequency, they can be added vectorially, i.e. the resultant signal is the vector sum of the signal from each antenna. The vector is also derived from two vectors whose phase shift is $(\pi\times D\times\cos(\theta))/\lambda$ leading from antenna 520, and lagging from antenna 510.

The magnitude of the resultant vector can be expressed mathematically as $\sqrt{(X_{510}+X_{520})^2+(Y_{510}+Y_{520})^2}$, where "X" terms are derived from the cosine of the magnitudes, and "Y" terms are derived from the sine of the magnitudes.

The signal transmitted from antenna 510 has amplitude A, and the signal transmitted from antenna 520 has magnitude 1. Therefore the amplitude of the signal in direction θ can be expressed as follows, where $\alpha=(\pi\times D\times\cos(\theta))/\lambda$.

$$\sqrt{(\cos(\alpha) + A\cos(-\alpha))^2 + (\sin(\alpha) + A\sin(-\alpha))^2}, \text{ or}$$

-continued $$\sqrt{\cos^2(\alpha) + \sin^2(\alpha) + A^2(\sin^2(\alpha) + \sin^2(-\alpha)) + 2A(\cos^2(\alpha) - \sin^2(-\alpha))}$$

This can be further simplified to:

$$\sqrt{1+A^2+2A(\cos^2(\alpha)-\sin^2(-\alpha))}, \text{ or}$$

$$\sqrt{1A^2+2A\cos(2\alpha)} \quad (1)$$

Figure 6:
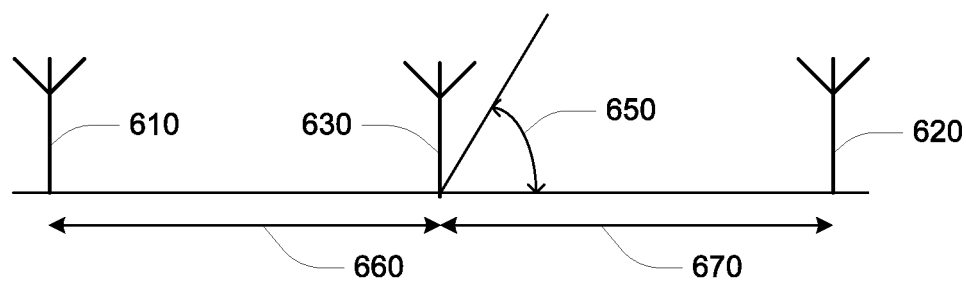
FIG. 6 is a schematic view of three antennas.

Referring to FIG. 6, the power of a signal received from three antennas, separated by a distance D 660 and 670, will depend upon the signal power of each antenna 610, 620 and 630, and the angle θ 650.

In this example, the signal transmitted by antennas 610 and 620 each has an amplitude A (A<=1), but are 180 degrees out of phase. Antennas 610, 620 and 630 each transmit t the same frequency The resultant, signal in direction θ is from antenna 630, combined with signals with amplitude A having leading and lagging phase angles of ±(2×π×D×cos(θ))/λ transmitted from antennas 620 and 610 respectively.

The resulting antenna pattern as a function of θ and A, can be expresses mathematically as follows, where α=(π×D×cos(θ))/λ.

$$\sqrt{(1 + A\cos(2\alpha) + A\cos(-2\alpha))^2 + (A\sin(2\alpha) + A\sin(-2\alpha))^2}, \text{ or}$$

$$\sqrt{(1 + 2A\cos(2\alpha))^2}$$

This can be further simplified to:

$$1+2A\cos(2\alpha) \quad (2)$$

It will be appreciated that the antenna pattern of the radiated signal from a single isolated omni-directional antenna is circular. When transmitting from two antennas, the effective antenna pattern can be expressed mathematically as follows:

$$\sqrt{1+A_1^2+2A_1\cos(2\pi D\cos(\theta)/\lambda)} \quad (3)$$

The original signals for transmitting from respective antennas can be "pre-distorted" such that the transmission pattern of the combined transmission is substantially circular, or at least has lower distortion when compared to the transmission pattern of the antennas when transmitting the original undistorted signals.

As α=(π×D×cos(θ))/λ is varied from α=0 to α=0.5, each level of phase change required has a corresponding value of $A_1$. The value of $A_1$, can be used to find a value $A_2$ that maintains the resulting antenna pattern of the combined transmission to more closely approximate a circular antenna pattern. The required value of $A_2$ is determined by minimizing the variation in value of the effective resultant amplitude of the signal determined by multiplying equations (2) and (3), as expressed in the following equation.

$$\frac{(1+2A_2\cos(2\pi D\cos(\theta)/\lambda))+}{\sqrt{1+A_1^2+2A_1\cos(2\pi D\cos(\theta)/\lambda)}} \quad (4)$$

By minimizing the variation in effective amplitude the resultant radiation pattern more closely approximates a circular antenna pattern.

The value of $A_1$ for each point in the transition from α=0 to α=0.5 is dictated by the need to move the phase in a linear fashion. $A_2$, can then be adjusted such that the resulting antenna pattern predicted by equation (4) provides a selected level of distortion. By way of example, the level of distortion can be calculated as the lowest root mean square deviation from a circular pattern.

It will be appreciated that, for the values derived above, for any value of $A_1$ it is possible to calculate a value of $A_2$ to provide a closer approximation to a circular antenna pattern.

The selected input values for $A_1$ and $A_2$ provide an output that mathematically determines the relative amplitude of the output signal. This is a theoretical determination of the required variables. In practice, the amplitudes of all antennas can be constantly adjusted to ensure that the same mean amplitude is radiated. That is, as well as adjusting relative amplitudes of all antennas, an overall common "gain" can also be applied.

Compensation can be further implemented by driving four or more antennas, to simultaneous enable compensation for both antenna radiation and coupling.

Figure 7:
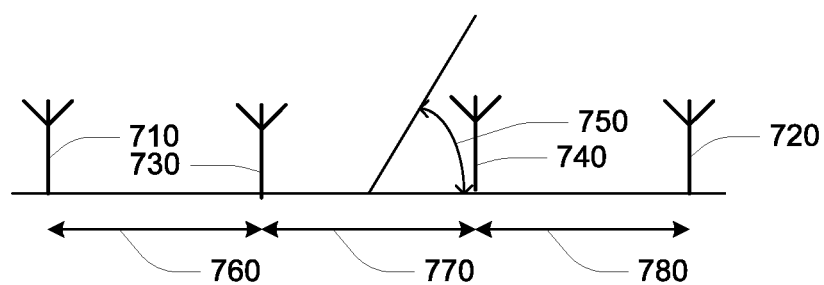
FIG. 7 is a schematic view of four antennas.

Referring to FIG. 7, the power of a signal received from four antennas (710, 720, 730, 740), separated by a distance D (760, 770, 780), will depend upon the signal power of each antenna, and the angle θ 750.

It will be appreciated that, while the following principle is exemplified by using four antennas, it applies equally to driving compensation signals and active signals into more than four antennas.

In this example, a signal will drive antenna 710 to transmit at a signal level of ($A_1 \times A_2$) in reverse phase. A signal will drive antenna 730 to transmit at a signal level of ($A_1 \times C$), where C is the effective $A_2$ value for an antenna with relative amplitude of 1. A signal will drive antenna 740 to transmit at a signal level of (1−($A_1 \times A_2$)). A signal will drive antenna 720 to transmit at a signal level of ($A_2$).

If signals are only sent to four antennas per side-band, then the antenna switching preferably occurs when the phase rotation had moved all the way across from antenna 740 to antenna 730. At this point, the level of the signal driving antennas 710 and 720 would be at zero, so as to reduce commutation noise.

By driving signals to four or more antennas per sideband, a reduction can be achieved in the level of 60 Hz and 1440 Hz/1500 Hz AM modulation of the sidebands. The system "pre-distorts" the antenna patterns to compensate for the distortion associated with two radiating antennas, to reduce unintentional modulation.

Compensation for mutual coupling between antennas can also be achieved using this technique. Coupling occurs when one antenna radiates causing its adjacent antennas to re-radiate an attenuated signal that has been phase shifted. Therefore, it is possible to provide a signal to the adjacent antennas to compensate for the coupled signal. The compensating signal amplitude and phase is adjusted so that when summed with the coupled signal, the signal level transmitted from the antenna is reduced when compared to the transmitted coupled signal alone.

The coupled attenuation and phase shift can be determined by measurement, a compensation signal is sent to the adjacent antennas to reduce the impact of the coupling. Because of the phase shift associated with the coupling, the addition would be a vector addition.

When simultaneously driving four adjacent antennas, modifying the phases and amplitudes of the two "steering signals" (for example transmitted by antenna 730 and antenna 740), and adding a further compensating signal to drive antenna 710 and 720, compensation for coupling can be achieved.

By driving signals to four antennas per sideband, 60 Hz and 1440 Hz/1500 Hz AM modulation of the sidebands can be reduced. The system will pre-distort the antenna patterns to compensate for the errors associated with two simultaneously radiating antennas, and also compensate for coupling between antennas.

In an example embodiment, simultaneous reduce coupling and antenna radiation pattern errors can provide an improved D-VOR signal. This D-VOR signal can further provide improved D-VOR bearing accuracy at a receiver.

The present invention can reduce unintentional AM modulation of the sub-carrier to levels below current ICAO and EUROCAE specifications and requirements.

The application of digital technology to the active compensation of a D-VOR system enables unintentional modulation levels to be reduced. The D-VOR can provide greater navigational accuracy. This makes the system suitable for use in military and commercial air navigation systems.

The digital technology used further allows for miniaturization of systems, which can realise production and maintenance reductions. Lack of moving parts further enables the manufacture of robust and reliable system, which is a highly desirable feature of air navigation systems.

A system and method is taught for reducing the distortion in radiated signals transmitted from a D-VOR system (or beacon). In this system, these unwanted signal modulations or pattern distortions are actively reduced so as to produce an almost insignificant modulation index. It will be appreciated that present invention is not limited to D-VOR systems and can be applied to other antenna array systems.

Distortions in radiated signals of a conventional D-VOR system can be so significant as to produce a modulation index in excess of 40%. The European Organisation for Civil Aviation Electronics (EUROCAE) has specified minimum performance requirements suitable for Ground Conventional and Doppler VOR Equipment. These specifications can be found in EUROCAE document ED-52. Additionally, the International Civil Aviation Authority (ICAO) has specified requirements in Volume 1 of ICAO Annex 10 for International Standards and Recommended Practices for Aeronautical Telecommunications. These ICAO standards stipulate at Annex 10, Clause 3.3.5.6.(b), among other things, that the unintentional AM modulation of the sideband signals produced in a ground based D-VOR system should not exceed a modulation index of 40%.

Previous attempts compensating for distortion to the resultant antenna system radiation pattern, including issues relating to finite counterpoise, did not adequately attempt to address, or reduce, unintentional modulation distortion detected at a receiver as a result of adjacent antennas radiating simultaneously and/or a result of a radiating antenna coupling with an adjacent non-radiating antenna.

It will be appreciated that the illustrated system and method provide an improved means of generating a radio frequency signal for allowing a receiving device to calculate a navigational indicator relative to a plurality of antennas.

It will be further appreciated that the prior art disclosed above does not compensate for the dynamic antenna pattern distortions that arise.

Example embodiments compensate for the distortion arising from the dynamically changing antenna patterns in a D-VOR system. These distortions are in part, caused by the coupling between antennas in the array and the signal artefacts that result when two adjacent antennas actively radiate. Compensation for these distortions can be achieved by simultaneously actively radiating signals in four or more antennas.

Unless specifically stated otherwise, as apparent from the following discussions, it is appreciated that throughout the specification discussions utilizing terms such as "processing", "computing", "calculating", "determining" or the like, refer to the action and/or processes of a computer or computing system, or similar electronic computing device, that manipulate and/or transform data represented as physical, such as electrolic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes a source device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a component playback unit. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computers product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiment of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would, be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein; unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, While there has been described what are believed to be the preferred embodiments of the invention, those, skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

The invention claimed is:

1. A system configured to provide a combined transmission, the system comprising:
 a plurality of circumferentially-located antennas;
 a reference antenna located centrally to the plurality of antennas; and
 a radio frequency generator unit coupled to at least one of the plurality of circumferentially-located antennas, the radio frequency generator unit configured to:
  generate a primary signal for driving at least one antenna of the plurality of antennas to provide a primary transmission;
  apply the primary signal to at least one of the plurality of circumferentially-located antennas to transmit the primary transmission;
  generate a secondary signal actively-derived from the primary signal to compensate the primary signal and reduce, at least in part, an antenna radiation pattern distortion of the primary transmission; and
  apply the secondary signal to at least one other antenna of the plurality of circumferentially-located antennas adjacent to the at least one antenna to provide, collectively with the primary transmission, a combined transmission having a reduced observed distortion at a receiving device compared with an observed distortion of the primary transmission alone,
 wherein the combined transmission allows the receiving device to calculate a navigational indicator relative to the plurality of circumferentially-located antennas.

2. The system of claim 1, wherein the radio frequency generator unit is further configured to:
 generate at least two primary signals, and
 independently apply the at least two primary signals to a first pair of adjacent antennas of the plurality of circumferentially-located antennas to provide the primary transmission.

3. The system of claim 2, wherein the radio frequency generator unit is further configured to separately apply a predetermined blending function to each of the at least two primary signals such that the principal source of the primary transmission transitions from one antenna in the first pair of adjacent antennas to other adjacent antenna in the first pair of antennas.

4. The system of claim 2, wherein the radio frequency generator unit is further configured to:
 generate at least two secondary signals; and
 apply each of the at least two secondary signals to a respective antenna of the plurality of antennas such that the first pair of adjacent antennas is disposed therebetween.

5. The system of claim 1, wherein the radio frequency generator unit is further configured to:
 generate a first set of signals including at least two primary signals and two secondary signals;
 apply the first set of signals to a first set of at least four adjacent antennas of the plurality of circumferentially-located antennas;
 generate a second set of signals including at least two primary signals and two secondary signals; and
 apply the second set of signals to a second set of at least four adjacent antennas of the plurality of circumferentially-located antennas,
 wherein the first set of at least four adjacent antennas and the second set of at least four adjacent antennas are substantially diametrically located on a circle, and the first set of signals and the second set of signals are applied to both sets of at least four adjacent antennas.

6. The system of claim 1, wherein the radio frequency generator unit comprises a switch unit configured to dynamically selectively couple each primary and secondary signal to an antenna of the plurality of antennas, such that the source of the combined transmission is transitionable in a substantially continuous cycle about the circumference of the circle.

7. The system of claim 1, wherein the observed distortion arises from the juxtaposition of the plurality of antennas.

8. The system of claim 1, wherein the observed distortion arises from simultaneous transition from two or more antennas of the plurality of antennas.

9. The system of claim 1, wherein the observed distortion includes AM modulation of the combined transmission observed at the receiving device.

10. The system of claim 1, wherein the radio frequency generator unit is further configured to generate a reference signal, wherein the reference signal is applied to the reference antenna to provide a reference transmission.

11. The system of claim 1, wherein the radio frequency generator unit is further configured to dynamically control phase, frequency and amplitude of each of the primary and secondary signals.

12. The system of claim 1, wherein the radio frequency generator unit comprises a plurality of numerically controlled oscillators configured to actively independently generate each of the primary and secondary signals.

13. The system of claim 12, wherein each of the plurality of numerically controlled oscillators enables digital control of the generated signal phase, frequency and amplitude.

14. The system of claim 12, wherein control of each of the plurality of numerically controlled oscillators is derived with reference to a substantially stable reference clock signal (stable temperature compensated clock circuit).

15. The system of claim 1, wherein the navigational indicator is a directional indicator relative to the plurality of antennas.

16. A system configured to provide a combined transmission, the system comprising:
- a plurality of circumferentially-located antennas;
- a reference antenna located centrally to the plurality of circumferentially-located antennas; and
- a radio frequency generator unit configured to:
  - generate at least two primary signals;
  - apply the at least two primary signals to at least two adjacent antennas of the plurality of circumferentially-located antennas to provide a primary transmission;
  - generate at least two secondary signals which are actively-derived from the at least two primary signals; and
  - apply the at least two secondary signals to at least two other antennas of the plurality of circumferentially-located antennas to provide, collectively with the primary transmission, a combined transmission,
  - wherein the at least two adjacent antennas are disposed between the at least two other antennas,
  - wherein the combined transmission is configured to allow a receiving device to calculate a navigational indicator relative to the plurality of antennas,
  - wherein the at least two secondary signals are configured to compensate the at least two primary signals to, at least in part, reduce antenna radiation pattern distortion of the primary transmission, and
  - wherein the combined transmission provides a reduced observed distortion at the receiving device as compared with an observed distortion of the primary transmission alone.

17. The system of claim 16, wherein the radio frequency generator unit is further configured to separately apply a predetermined blending function to each of the at least two primary signals thereby to transition a principal source of the primary transmission from one antenna of the least two adjacent antennas to another antenna.

18. The system of claim 16, wherein the radio frequency generator unit is further configured to:
- generate a first set of signals including at least two primary signals and two secondary signals; and
- apply the first set of signals to a first set of at least four adjacent antennas of the plurality of circumferentially-located antennas;
- generate a second set of signals including at least two primary signals and two secondary signals; and
- apply the second set of signals to a second set of at least four adjacent antennas of the plurality of circumferentially located antennas,
- wherein the first set of at least four adjacent antennas and the second set of at least four adjacent antennas are substantially diametrically located on the circle, and
- wherein the first set of signals and the second set of signals are applied simultaneously to both sets of at least four adjacent antennas.

* * * * *

UNITED STATES PATENT AND TRADEMARK OFFICE
CERTIFICATE OF CORRECTION

PATENT NO. : 8,704,712 B2 Page 1 of 1
APPLICATION NO. : 13/063599
DATED : April 22, 2014
INVENTOR(S) : Le Comte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 370 days.

Signed and Sealed this

Twenty-ninth Day of September, 2015

Michelle K. Lee
*Director of the United States Patent and Trademark Office*